United States Patent Office 3,605,801
Patented Sept. 20, 1971

3,605,801
SHOCK ABSORBER PISTON WITH FLOATING VALVE
Christian Bourcier de Carbon, 64 Boulevard Maurice-Barres, 92 Neuilly-sur-Seine, France
Filed Feb. 28, 1969, Ser. No. 803,363
Claims priority, application France, Mar. 1, 1968, 142,058
Int. Cl. F16d 57/00
U.S. Cl. 137—513.7
4 Claims

ABSTRACT OF THE DISCLOSURE

The shock absorber valving includes an upper radially outwardly disposed annular seat and a lower radially inwardly disposed annular seat and a floating annular thin disc valve element having a radially outward portion adapted to seat against the first named seat and a radially inward portion adapted to seat against the second named seat; a fixed washer rigid with said lower second named seat, disposed approximately co-planar with the valve disc, but having an outside diameter slightly smaller than the inside diameter of the annular valve disc, whereby a narrow annular slit by-pass passageway is provided. Underlying said washer, the lower seat member is provided with a series of openings forming continuations of said narrow slit passageway. Alternatively, an annular groove or trough can be provided immediately beneath the slit and a series of separate passageways below the groove.

Importantly, the outer portion of said valve disc has virtually line contact with the upper outer annular seat inwardly of the periphery of the disc, the diameter D of the disc and the diameter $d$ of the circular line of contact bearing the relationship $$\frac{D-d}{d}$$

is equal to or greater than approximately 15%.

---

The present invention relates to a flow control valve intended for hydraulic shock absorbers in general or for similar suspension apparatus, and more particularly, a piston intended for suspension shock absorbers for vehicles.

It is already known how to make such a valve or piston for a shock absorber by the use of a single clack valve operating in both directions, made up of a thin annular disc or a pack of annular discs arranged between two concentric seats, the inside edge of the disc valve seating against one of the seats by one of its faces, and the outside edge of the disc working against the other seat upon its opposite face.

The present invention has for its object improvements in this type of valve, and more particularly two improvements which will be described presently. These two improvements can be used separately, but they will preferably be associated, so as to constitute a combination having particularly remarkable mechanical and hydrodynamic properties.

The piston (or control valve) according to the invention is made up essentially of four parts centered on and secured to the rod B by means of the nut N, namely—

(1) A rigid circular block P pierced by large orifices O for the free passage of the oil and comprising a cylindrical skirt J against the lower edge of which the outside part of the upper face of the valve disc C seats; an annular groove F being formed in the lower face of the block P between the skirt J and a central annular projection S;

(2) A central annular support piece A against which the inside part of the lower face of the disc C seats;

(3) The annular clack valve disc C;

(4) A flat washer R damped between block P and piece A, this washer having an outside diameter less than that of the central hole of annular clack disc C, and preferably having a thickness less than that of clack valve C to achieve a certain pre-stress in the initial seating of the clack valve between skirt J and piece A. This flat washer R will preferably be made by simple punching of thin sheet metal.

Figure 1:
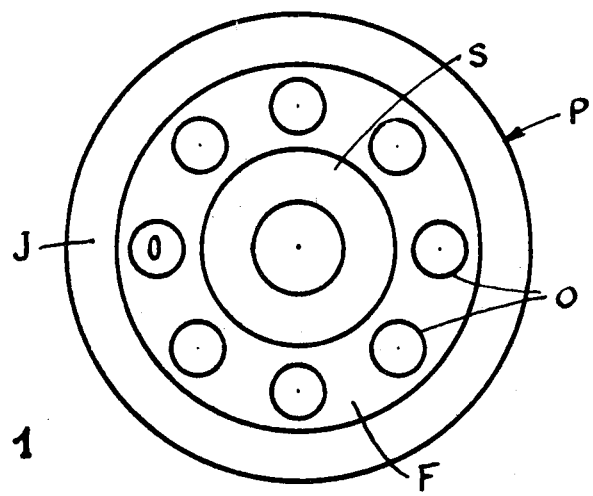
FIG. 1 is a bottom plan view of the block comprising the body portion of a piston embodying the principles of the invention.
Figure 2:
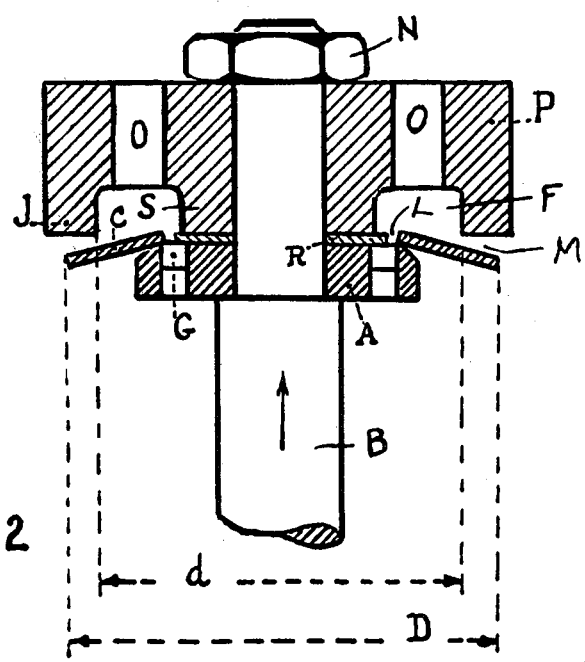
FIG. 2 is a vertical section of view of the piston under conditions of compression movement.
Figure 3:
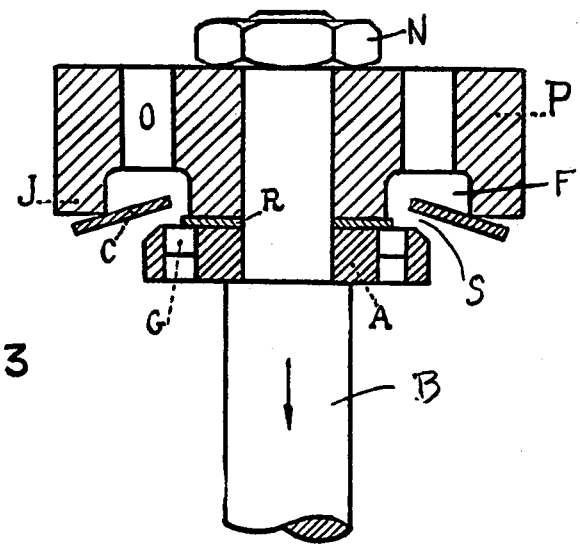
FIG. 3 is a similar view as when the piston is in expansion movement.

The operation of this piston is illustrated by FIGS. 2 and 3. During the compression movement (upward in FIG. 2) the valve disc rests on piece A by the inside part of its lower face, and bends to the shape of a cone, freeing between its upper face and skirt J the annular opening M necessary for the movement of the oil.

During the expansion movement (downward in FIG. 3), the valve disc seats on skirt J by the outside part of its upper face, and bends in the shape of a cone, freeing between its lower face and the ensemble of pieces A and R the annular openings necessary for the movement of the oil.

For such a piston to be able to assure a comfortable ride, it is necessary to improve the design by the use of permanently open passages. There have been proposed different ways of making these permanent passages, for example, by notches or grooves made in the end of skirt J, or else by making suitable perforations in clack C.

The first improvement that is particularly the object of the present invention consists in simply using for permanent passage the space existing between the inside diameter of disc C and the outside diameter of flat washer R. The permanent passage is then in the shape of a slight circular slit L between washer R and clack C, the direction of the flow of oil being parallel to the axis of the piston.

This technique is extremely favorable for riding comfort. Moreover, it offers the advantage of an extremely simple realization of the permanent passage provision.

Figure 4:
FIG. 4 is a vertical sectional view of a valve-seating member in one embodiment.
Figure 5:
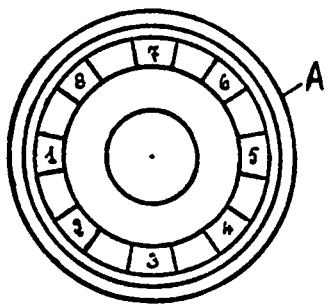
FIG. 5 is a plan view of the same.

However, this technique requires a special design for support piece A. The preferred shape is that represented in FIGS. 4 and 5. The circular slit L of the permanent passage then opens out into a circular groove G fed by a certain number of perforations, preferably, trapezoidal as shown in FIG. 5, and, in this embodiment, eight in number.

Figure 6:
FIG. 6 is a view similar to FIG. 4 of another embodiment.
Figure 7:
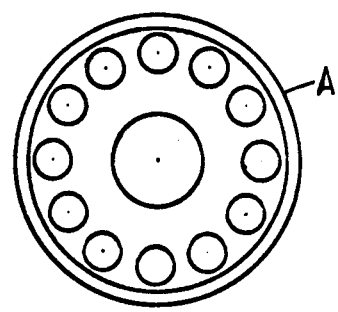
FIG. 7 is a view similar to FIG. 5 of that second embodiment.

It would be possible, without going outside the scope of the invention, to design piece A as shown in FIGS. 6 and 7. In this case, piece A no longer has circular groove G, but only a certain number of separate perforations H, and the permanent passage between washer R and clack valve C no longer exhibits a continuous slit but an ensemble of slits of short length.

This technique for the permanent passage makes it possible to obtain a very remarkable riding comfort. However, it is difficult to obtain a permanent passage with a perfectly defined section when clack valve C is made up of a pile of discs, because the discs never stay perfectly centered on one another.

To avoid operating troubles resulting from the uncontrolled variation of the permanent passage, it is therefore desirable to use only a single disc to make up clack valve C. But when only a single disc is used, metal fatigue is much greater and breaking of the disc results, if special precautions are not taken, for example, by installing stops to limit the bending.

However, the second improvement, which is particularly the object of the present invention, consists in the provision of a particularly simple means making it possible to reduce fatigue of the clack valve considerably and to avoid its breaking without being forced to use stops to limit the bending. It consists in using for skirt J a support diameter $d$ that is notably smaller than the diameter D of the clack valve disc.

Study of the distribution of the hydrodynamic pressure on the surface of the disc during movement of the piston actually shows that, for the same resistance factor of the piston and for a given force exerted on its rod, the fatigue of the clack valve drops very quickly when diameter $d$ of skirt J is reduced, while maintaining the diameter D of the clack constant, and this is the case both of the compression movement and the expansion movement.

Consequently, it will be within the scope of the invention to provide a piston according to the above specifications and such that the quotient $$\frac{D-d}{d}$$

is greater than or equal to approximately 15%.

What is claimed is:

1. In a hydraulic double acting shock absorber of the cylinder and piston type, a piston comprising a valve assembly provided with an outwardly disposed annular valve seat, and an annular floating clack valve disc disposed concentrically with said seat and adapted to have the radially outward portion of one surface seat against said seat upon flow of hydraulic fluid in one direction, an inwardly disposed annular valve seat rigid with said valve assembly on the opposite side of said valve disc, against which the radially inward portion of the opposite surface of said valve disc is adapted to seat upon flow in the opposite direction, a washer element of approximately the thickness of said valve disc disposed in the approximate normal plane thereof and coaxially therewith, said washer element having an outside diameter somewhat smaller than the inside diameter of said annular valve disc, whereby a thin annular slit remains as part of a permanently open passageway through the valve assembly, and said passageway continues through the assembly in the form of further passageways in communication with said slit.

2. The valve assembly as set forth in claim 1 in which said further passageways open directly from said slit and thus serve in effect to divide said slit into an annular series of discontinuous slit-like openings.

3. The valve assembly as set forth in claim 1 in which said further passageways comprise a completely annular passageway substantially coinciding with but wider than said annular slit, and debouching into an annular series of separate passages therebeyond.

4. The valve assembly as set forth in claim 1 in which said valve disc contacts an annular edge on said outward seat, upon flow of fluid in one direction, on a circular line of contact lying radially inward from the outer periphery of said disc, and dimensions of the full diameter D of the valve disc, and of the diameter $d$ of said contact circle are determined by the quotient $$\frac{D-d}{d}$$

being equal to or greater than approximately 15%.

References Cited

UNITED STATES PATENTS

| 2,320,697 | 6/1943 | Binder | 188—88.504 |
| 3,164,225 | 1/1965 | De Carbon | 188—88.505X |
| 3,256,961 | 6/1966 | De Carbon | 188—88.504 |
| 3,312,312 | 4/1967 | De Carbon | 188—88.505 |

LAVERNE D. GEIGER, Primary Examiner

D. J. ZOBKIW, Assistant Examiner

U.S. Cl. X.R.

138—43; 188—317